June 12, 1962  J. J. SEAGER  3,038,753
HOIST LINE GRAB HOOK
Filed Aug. 29, 1960
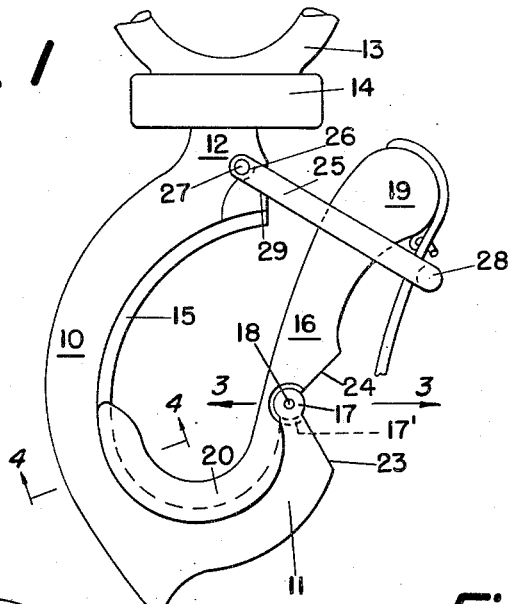
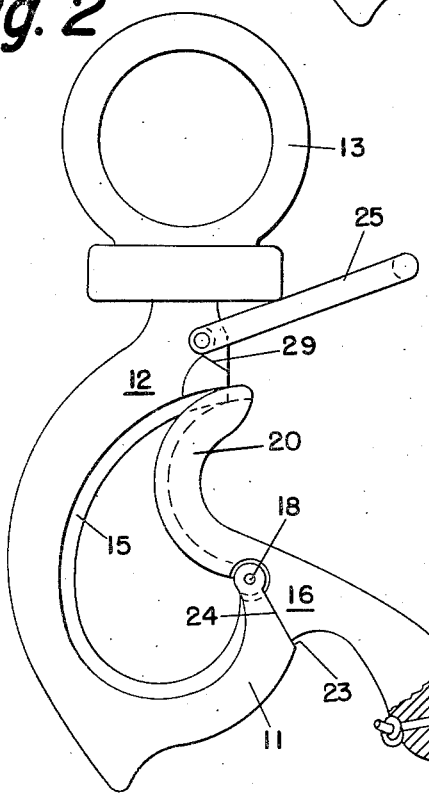
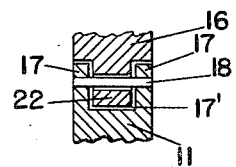
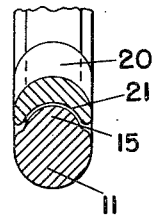
INVENTOR.
JOHN J. SEAGER
BY
*J. F. Sheha*
ATTORNEY

United States Patent Office 3,038,753
Patented June 12, 1962

3,038,753
HOIST LINE GRAB HOOK
John J. Seager, 61 Fellsway E., Malden, Mass.
Filed Aug. 29, 1960, Ser. No. 52,738
1 Claim. (Cl. 294—83)
(Granted under Title 35, U.S. Code (1952), sec. 266)

The invention described herein may be manufactured and used by or for the Government of the United States of America for governmental purposes without the payment of any royalties thereon or therefor.

This invention relates to hoist line grab hooks and is concerned particularly with such hooks for engaging rings or shackles for handling cargo nets or for raising and lowering small boats such as life boats from and to surface vessels.

The broad object of the invention is to provide a hook assembly which is readily attachable to and releasable from rings or shackles without subjecting operating personnel to physical injury.

Another object of the invention is to provide hook structure which is arranged to guide the hook into operative position with ring or shackle receiving elements.

Another object is to provide a hook assembly which is arranged to prevent hoist lines from entanglement with the hook structure.

A specific object is to arrange an assembly of a hook and cooperating elements in such a manner as to permit an operator to manipulate the assembly at a zone remote from the material being handled and thus to preclude the possibility of injury to an operator.

Other objects will be apparent from a more detailed understanding of the invention.

The hook assembly of this invention is of the general type disclosed in Patent 894,345 to J. R. Raymond issued July 28, 1908. The type of hook assembly has been and is in use by the U.S. Navy and while generally satisfactory, it has not overcome all the problems which it was intended to overcome. The hook assembly of this patent is formed of two cooperating elements, one element comprising a large hook having a shank end portion which is provided with a connection for receiving a hoist line and a bill end portion with a claw portion therebetween which supports the weight of the material or object being handled. The other element comprises a similarly shaped small hook which is pivotally mounted to the larger hook and reversely thereof to permit the bill end portion and claw portion of the small hook to seat on the claw and bill portion of the large hook. The small hook by its pivotal mounting is arranged to function as a releaser for manipulating the ring or shackle from the hook assembly when desired during the handling of cargo, etc. That manipulating is done by means of a lanyard attached to the small hook.

In using the above generally described hook assembly, an operator is still subject to injury since the hoist lines frequently become entangled with or behind the small hook or releaser. This is due to the fact that the throat of the hook assembly is open when a ring or shackle is received by the assembly and also when the ring or shackle is removed from the assembly permitting the hoist or other lines to enter the throat. When, for example, the shackle of a life boat is received by the assembly and as the life boat is lowered in contact with the ocean surface, the weight of the boat will be removed from the hook assembly permitting the releaser or small hook to move to open position and causing the hoist line to become slack in which condition it may enter the throat of the hook assembly by wave turbulence of the ocean surface and then become lodged behind the releaser or small hook.

The present invention is directed particularly to overcoming this problem. Also, the invention provides an arrangement for locking a ring or shackle in position on the hook assembly by providing structural elements which maintain the throat of the hook assembly closed when a ring or shackle is received by the hook assembly.

For a better understanding of the invention reference may be had to the drawings, wherein:

FIG. 1 is a view showing the grab hook assembly elements in their relative positions after a cargo net ring or a life boat shackle is received by the assembly;

FIG. 2 is a view of the hook assembly of FIG. 1 with the elements in their relative positions after a ring or shackle has been released;

FIG. 3 is a sectional view looking in either direction of the arrows 3—3 of FIG. 1;

FIG. 4 is a sectional view taken on the line 4—4 of FIG. 1.

In FIGS. 1 and 2, a large hook is indicated at 10 and is comprised of a bill 11 at one end and at its other end a shank 12. A connector 13 is attached to the shank 12, and preferably by a swiveled mounting 14 for receiving a hoist line (not shown). Between the bill 11 and shank 12 a claw portion 15 is provided which is generally arcuate and as shown in FIG. 4 is shaped to provide a tongue 15 which extends from the shank 12 to the bill 11. The releaser or small hook is indicated at 16 and is pivoted to the bill 11 of the large or fixed hook by a pivot pin 18 to dispose similar portions of the hooks in opposed relation as shown in FIG. 1. The releaser or small hook 16 is formed with its shank end providing a weighted arm 19 which pivots the bill portion 20 in its position shown in FIG. 2 when no weight is suspended by the hook assembly. The claw and bill portion 20 of the releaser or small hook 16 is grooved at 21 and receives the tongue portion 15 of the hook 10 as shown in FIG. 4. The details of the pivoted connection between bill 11 of the large hook 10 and the releaser or small hook 16 is clearly shown in FIG. 3 wherein 16 is rabbetted adjacent the inner end of the shank 19 to provide a small tongue section 22 and the bill 11 is grooved at 17' to provide extensions 17—17 which receive the section 22 therebetween, the small tongue section 22 and walls 17—17 being apertured to receive the pivot pin 18.

In use the large hook 12 will be suspended by a hoist line and a ring or shackle passes between the shanks 12 and 19 when it is received by the hook assembly or removed therefrom and it is essential at all times that the upper end of the groove 21 on the inner curved face of hook 16 receive some portion of the tongue 15 on the inner curved face of hook 10 in order to prevent the entry of any lines such as the hoist line between these elements. To this end the design relationship of the tongue 15 and groove 21 is such that the tongue 15 provides a guide which receives the groove 21 when the releaser or small hook 16 is changed from the position shown in FIG. 1 to that shown in FIG. 2 and vice versa. FIGS. 1 and 2 of the drawings have been laid out in accordance with this design and as can be readily seen from an inspection of the drawings, as the releaser or small hook 16 is pivoted from its position in FIG. 1 the bill 20 will move to the position shown in FIG. 2, at all times maintaining contact with the arcuate tongue 15 of the large hook 10. In order to maintain the throat of the hook assembly closed after the releaser is moved to the position in FIG. 2 and to maintain it in this position, stop means 23 is provided on the bill 11 of the large hook 10 which coacts with stop means 24 provided on the releaser or small hook 16 as shown in FIGS. 1 and 2.

In order to prevent entry of a hoist or other line into the throat of the hook assembly when the elements are in the position shown in FIG. 1 and in order to retain a ring or shackle within the hook assembly, a locking feature is provided for the hook assembly. This may be in the form of a clevis 25 having its open ends 26 pivotally connected at 27 to the shank 12 of the large hook 10 and its closed end 28 spaced from its pivoted end a sufficient distance to receive the weighted arm 19 of the releaser or small hook 16 as in the position of FIG. 1. As shown in FIG. 1, a stop 29 is formed on the shank 12 for abutting an arm of the clevis 25 to maintain the clevis in its extended position of FIG. 1 to retain a ring or shackle within the assembly. In FIG. 2, the clevis 25 is moved upwardly from the stop 29, permitting the weighted arm 19 to pivot downwardly to the position shown. No means is shown to maintain the clevis 25 in the position of FIG. 2, but of course the arms of the clevis could be spring urged against the shank 12 for this purpose. In order to manipulate the releaser or small hook 16, a lanyard 30 is attached to its weighted arm 19. When a shackle, for example, is to be received by the hook assembly, the weighted arm 19 and lanyard 30 are first passed into the shackle, then raised to the position of FIG. 1 while the clevis 25 is in its position of FIG. 2. This manipulation will seat the shackle on the claw portion of the releaser or small hook 16 and then the clevis 25 is lowered to its position of FIG. 1. The shackle may then be ejected by further manipulation of the lanyard 30 to raise the clevis 25 to remove it from the weighted arm 19 and then pulling the arm to its position of FIG. 2.

It will be apparent to those skilled in the art that various changes may be made to the present disclosure without departing from the spirit of the invention or from the scope of the appended claims.

What is claimed is:

A hoist line grab hook assembly comprising a supporting hook having a shank and a claw, said shank being adapted for attachment to structure and said claw depending therefrom and terminating at its lower end in an upturned bill providing a curved inner face between the shank and bill, a releaser having a shank and a claw, said releaser being pivotally connected to said upturned bill and disposed in the same plane as the claw of the supporting hook, said shank of the releaser extending outwardly of the bill of the supporting hook and being weighted to normally pivot to a down position and to pivot the claw of the releaser to an up position, said claw of the releaser extending inwardly of the bill of the supporting hook and being sufficiently long to be in contact with the curved inner face of the supporting hook when in its up position, stop means on said bill of the supporting hook and cooperating stop means on the shank of the releaser for maintaining the claw of the releaser in its up position whereby to prevent entry of any lines into the claw of the supporting hook.

References Cited in the file of this patent

UNITED STATES PATENTS

| 380,786 | Cathcart | Apr. 10, 1888 |
|---|---|---|
| 894,345 | Raymond | July 28, 1908 |
| 965,655 | Porter | July 26, 1910 |
| 2,559,999 | Regan et al. | July 10, 1951 |
| 2,568,939 | Wilson | Sept. 25, 1951 |

FOREIGN PATENTS

| 22,404 | Great Britain | Oct. 2, 1912 |
|---|---|---|
| 537,878 | Italy | June 20, 1954 |